March 4, 1941.  D. E. FOSTER ET AL  2,233,776
BAND WIDTH CONTROL DEVICE
Filed Jan. 7, 1938
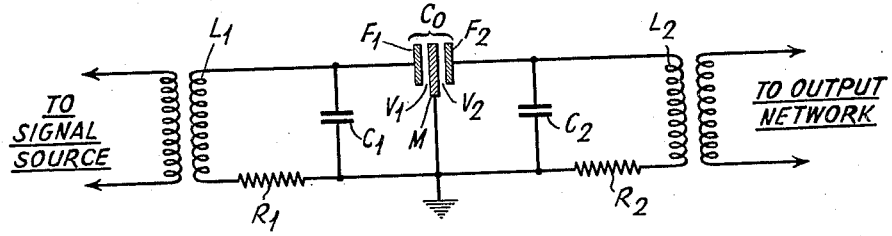
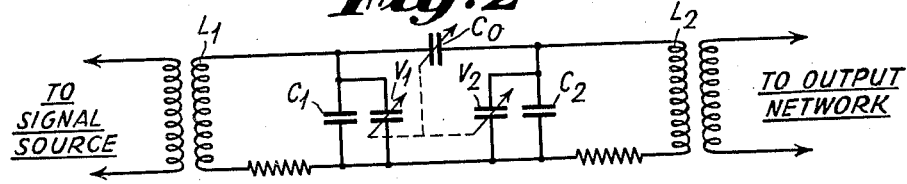
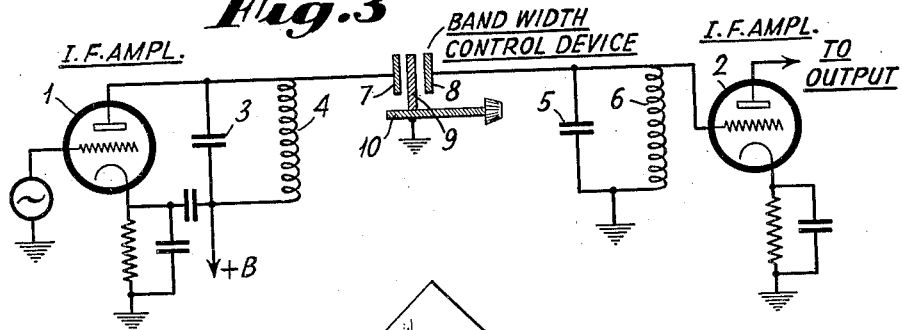
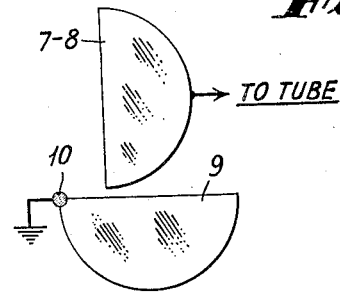
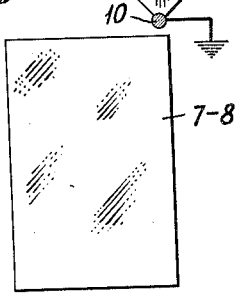
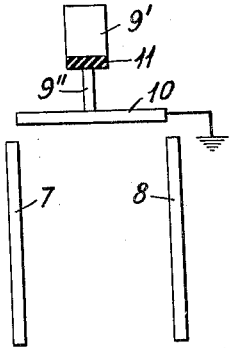
INVENTORS
DUDLEY E. FOSTER
WILLIAM S. BARDEN
BY
ATTORNEY Patented Mar. 4, 1941

2,233,776

UNITED STATES PATENT OFFICE 2,233,776

BAND WIDTH CONTROL DEVICE

Dudley E. Foster, South Orange, N. J., and William S. Barden, Grasmere, Staten Island, N. Y., assignors to Radio Corporation of America, a corporation of Delaware Application January 7, 1938, Serial No. 183,836

1 Claim. (Cl. 178—44)

Our present invention relates to networks provided with capacitative band width control devices, and more particularly to a variable coupling condenser constructed to vary the band width of a band pass network without shifting the mid-band frequency.

While many devices have been proposed in the past for varying the band width of a band pass network without disturbance of the magnitude of the mid-band frequency, yet such devices have usually involved complex circuit elements, or costly mechanical devices. For example, while the magnitude of the mutual inductance of the coils of a pair of similarly tuned, and reactively coupled, circuits may be varied to adjust the band width without appreciably varying the mid-band frequency, yet it is necessary to employ a mechanical arrangement for varying the relative positions of the coupled coils. In the construction of radio receivers of the broadcast type such mechanical arrangements are undesirable from a manufacturing cost viewpoint. Adjustable coupling capacitors have been proposed as a means for securing a variation in the band width of a band pass network, but experience has shown that concurrently with the band width variation there is secured a shift in the mid-band frequency; such a shift is undesirable and disadvantageous.

Accordingly, it may be stated that it is one of the main objects of our present invention to provide a variable coupling capacity device for a band pass network, and which device essentially comprises a pair of stator plates in electrostatic coupling relation; and a rotor plate which is constructed to vary the magnitude of the coupling capacity from substantially zero to any desired magnitude, thereby securing a variation in the band width of the network and without a change in the magnitude of the mid-band frequency.

Another important object of our invention may be stated to reside in the provision of a three plate coupling condenser for a pair of like-tuned circuits arranged in cascade; one of the plates being adjustable in its shielding action on the other two plates whereby the upper and lower limiting frequencies of the transmission band may be varied in opposite senses, but without shifting the value of the mean frequency of the band.

Still other objects of our invention are to improve generally the simplicity and efficiency of band width adjusting devices for band pass networks, and more particularly to provide such devices in a simple and economical form, and which are durable and reliable in operation.

The novel features which we believe to be characteristic of our invention are set forth in particularity in the appended claim; the invention itself, however, as to both its organization and method of operation will best be understood by reference to the following description taken in connection with the drawing in which we have indicated diagrammatically several circuit organizations whereby our invention may be carried into effect.

In the drawing:

Fig. 1 shows a band pass network employing the invention,

Fig. 2 is the electrically equivalent network of Fig. 1,

Fig. 3 shows a modified form of the invention,

Fig. 4 shows an end view of the coupling condenser employed in Fig. 3,

Figs. 5 and 6 show end and front views respectively of another modification.

Referring now to the accompanying drawing, wherein like reference characters in the different figures designate similar elements, in Fig. 1 there is shown a band pass network whose band width is variable; the special three plate coupling condenser being employed for securing the desired variation. The network comprises the pair of resonant circuits $L_1$—$C_1$ and $L_2$—$C_2$. Let it be assumed that a signal source, such as a modulated signal carrier amplifier used in broadcast reception, is coupled to coil $L_1$. Further, assume an output circuit coupled to coil $L_2$. The circuits $L_1$—$C_1$ and $L_2$—$C_2$ are each tuned to a common carrier frequency; that is, to a desired mid-band frequency $f_0$. $R_1$ and $R_2$ denote the resistance in each tuned circuit; these elements are made negligibly high in value, and greatly in excess of critical damping.

To maintain the magnitude of $f_0$ constant, while varying the band width, there is employed a coupling condenser comprising a pair of fixed plates $F_1$ and $F_2$. A movable plate M, centrally located with respect to the fixed plates, is connected to the grounded terminals of the two tuned circuits. Plate $F_1$ is connected to the high potential terminal of circuit $L_1$—$C_1$; plate $F_2$ is connected to the high potential terminal of circuit $L_2$—$C_2$. The electrostatic coupling capacity between the fixed plates is denoted by the symbol $C_0$; the symbols $V_1$ and $V_2$ designate the capacity developed between plate M and each of plates $F_1$ and $F_2$ as the plate M is moved into shielding position between the fixed plates. The magnitude of $C_0$ varies inversely with the magnitudes of $V_1$ and $V_2$; when the plate M is in complete shielding position the magnitude of $C_0$ is zero.

Fig. 2 shows the electrically equivalent network of Fig. 1. The dotted lines between capacities $C_0$—$V_1$—$V_2$ in Fig. 2 denote the concurrent variation of these capacities. The variation is such as to maintain $f_0$ while the upper and lower limit frequencies ($f_2$ and $f_1$) are varied. There will now be considered the various relations which exist between the network elements. The resistive elements have no material influence on the magnitude of $f_0$—$f_1$—$f_2$; they do affect the shape of the transmission characteristic. When the resistance is greatly in excess of critical damping, the case of capacity-coupled tuned circuits is analogous to tuned circuits coupled by mutual inductance; that is, for small frequency departures from $f_0$ a variation of the coupling capacity is practically identical in result with a variation of mutual inductance, except that mid-frequency shift occurs in the former case.

The construction shown in Fig. 1 avoids such a shift in $f_0$, because adjustment of plate M affects both the values of $f_1$ and $f_2$. If a simple variable capacity were used as $C_0$, variation of the latter changes the magnitude of $f_1$ (since $C_0$ is a factor in its value) but does not affect $f_2$ (since $C_0$ does not appear in its equation). Hence, it will be seen that to maintain the value of $f_0$ while varying the band width, a decrease in $f_1$ must be accompanied by an increase in $f_2$ such that the relation $$f_0 = \frac{f_2 - f_1}{2} + f_1$$

shall remain unaffected by changes in $C_0$. With a constant value for each of $L_1$ and $L_2$, variable capacitances $V_1$ and $V_2$ must be placed in shunt to each of condensers $C_1$ and $C_2$ and so varied with $C_0$ that $f_0$ is constant with changes in $f_1$ and $f_2$.

As regards the physical construction of the three plate condenser shown in Fig. 1, it is to be understood that the plate M may be reciprocated between the fixed plates $F_1$ and $F_2$; or the movable plate may be affixed to a rotatable shaft. The maximum value of each capacitance V may be between infinity and $2C_0$. This means that there shall be suitable wide spacing between the three plates of the condenser, and the thickness of the movable plate M is preferably small in comparison with the distance between the parallel plates F. With such a design, as the movable plate M is moved into position of complete screening, the capacity $C_0$ vanishes as each of the capacitances V increases to $2C_0$, it being understood that $C_0$ is here taken as the maximum value. In such complete screening position of the plate M, and with the relations noted, it can be shown that the value of $f_0$ remains fixed while the upper and lower limiting frequencies increase and decrease respectively.

Without entering into an extended analytical explanation, it can be stated that a practical physical relationship between the three plates of the coupling condenser can be such that the thickness of the movable, or rotatable, plate M should be approximately one-half the distance between the parallel fixed plates $F_1$ and $F_2$ in order that $f_0$ shall remain constant when $f_1$ and $f_2$ depart to their extreme values. As far as the relation between $C_0$ and each of the condensers $C_1$ and $C_2$ is concerned, it is desired to have the relation exist that $C_0 = 0.0101$ ($C_1$ or $C_2$). Hence, when $C_0$ has a value of at least 5 mmf., each of $C_1$ and $C_2$ will have a value of 500 mmf.; and a suitably low value for the coils L should be used. In this way it is possible to secure variation of the band width without change of the mid-band frequency $f_0$, and by the simple device of employing an auxiliary coupling capacity having an adjustable plate.

In Fig. 3 there is shown a band pass amplifier network employing our invention. Assuming the network is used in a superheterodyne receiver, tube 1 denotes an I. F. amplifier whose input electrodes are connected to a source of I. F. energy; tube 2 is a following I. F. amplifier whose input electrodes are coupled to the output electrodes of tube 1. The coupling network comprises I. F. tuned circuit 3—4 and I. F. tuned circuit 5—6. The variable coupling capacity device consists of stator plates 7 and 8; each stator being connected to the high potential side of its associated circuit. The central plate 9 is affixed to a rotatable shaft 10 which is grounded. Fig. 4 shows the appearance of the stator and rotor plates when viewed endwise.

The capacity between plates 7 and 8 provides the capacity $C_0$ in Fig. 2; the capacity between plates 7—9 provides the capacity $V_1$ in Fig. 2, while the capacity between plates 9—8 provides the capacity $V_2$. For a high value of Q in network 3—4; 5—6, the maximum value of $C_0$ is small, and the approximate relation $\Delta C' = 2\Delta C_0$ exists; where $C' = C_3 + C_5$.

In the case of low Q circuits the maximum value of $C_0$ is larger; to keep the value of $f_0$ constant, the relation $\Delta C' < -2\Delta C_0$ is followed. Such a relation can be secured by the construction shown in Figs. 5, 6. The rotor plate is divided into two metallic sections 9' and 9''; an insulation strip 11 separates the two sections. The section 9' is thicker than section 9''; the section 9'' is grounded through shaft 10. The proportion of rotation; the areas of sections 9'' and 9'; and the thickness of section 9', can be varied as desired.

When the Q (energy factor) of the circuits coupled together is low, or when the change in band width is relatively great, the change in C' must be greater than twice the change of $C_0$ to maintain the center frequency constant. The two section rotor blade accomplishes this result. At the start of rotation of the center rotor blade between the outer plates the change in C' is small since the section of the rotor there in use is thin; further rotation brings into action the thicker section of the rotor causing an effective decrease in the spacing of the outer plates (thinner dielectric) and an increase in the rate of change of C' required to keep to constant. The shape of the two sections is merely illustrative, as each may have such shape, depending upon the circuit Q, the change in band width and the details of mechanical construction, so that the required change in C' proportional to change in $C_0$ occurs to keep the mid-band frequency constant.

While we have indicated and described several systems for carrying our invention into effect, it will be apparent to one skilled in the art that our invention is by no means limited to the particular organizations shown and described, but that many modifications may be made without departing from the scope of our invention, as set forth in the appended claim.

What we claim is:

In a variable coupling condenser, adapted for variably coupling a pair of fixedly tuned circuits thereby to adjust the band width of the circuits over a relatively wide range, a pair of parallel spaced stator plates, a rotor plate disposed centrally of said pair of plates, a grounded rotatable support element for the rotor plate, said rotor plate comprising at least two insulated metal sections, one of said sections being substantially thinner than the other section, said thinner section being affixed to said support element.

DUDLEY E. FOSTER.
WILLIAM S. BARDEN.